(12) United States Patent
Liao et al.

(10) Patent No.: US 9,779,154 B2
(45) Date of Patent: Oct. 3, 2017

(54) SYNCHRONIZATION SYSTEM FOR TRANSFORMING DATABASE AND METHOD THEREOF

(71) Applicant: NATIONAL TSING HUA UNIVERSITY, Hsinchu (TW)

(72) Inventors: Ying-Ti Liao, Hsinchu (TW); Jia-Zheng Zhou, Hsinchu (TW); Yeh-Ching Chung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 320 days.

(21) Appl. No.: 14/664,077

(22) Filed: Mar. 20, 2015

(65) Prior Publication Data

US 2016/0171051 A1 Jun. 16, 2016

(30) Foreign Application Priority Data

Dec. 15, 2014 (TW) .............................. 103143739 A

(51) Int. Cl.
*G06F 17/30* (2006.01)
(52) U.S. Cl.
CPC .. *G06F 17/30575* (2013.01); *G06F 17/30672* (2013.01); *G06F 17/30864* (2013.01); *G06F 17/30867* (2013.01)
(58) Field of Classification Search
CPC ............................................... G06F 17/30575
USPC ........................................................ 707/765
See application file for complete search history.

(56) References Cited

U.S. PATENT DOCUMENTS

| 8,219,518 | B2* | 7/2012 | Jin | G06F 8/20 707/602 |
| 8,386,924 | B2* | 2/2013 | Fitzsimons | G06F 17/3089 715/235 |
| 8,504,513 | B2* | 8/2013 | Aski | G06F 8/30 707/601 |
| 2003/0046430 | A1* | 3/2003 | Iwade | G06F 17/30569 709/246 |
| 2006/0173951 | A1* | 8/2006 | Arteaga | H04L 67/1095 709/203 |
| 2007/0088671 | A1* | 4/2007 | McElroy | G06F 17/30011 707/705 |
| 2007/0136395 | A1* | 6/2007 | Fries | G06F 11/1464 707/804 |

(Continued)

*Primary Examiner* — Shahid Alam
(74) *Attorney, Agent, or Firm* — Muncy, Geissler, Olds & Lowe, P.C.

(57) ABSTRACT

A synchronization system for transform databases and a method thereof are provided. The system includes a database transformer and a data adapter. The database transformer is used to transform tables from a source database to a target database. The data adapter includes a statement parsing unit, a storage unit and a synchronization control unit. The statement parsing unit receives a query statement and parses a query table associated with the query statement. The storage unit stores the query statement temporarily. The synchronization control unit determines a query mechanism and receives a transformation state about the query table from the database transformer. Based on the query mechanism and the transformation state, the synchronization control unit performs the query statement in the source database, the target database, or both of them.

7 Claims, 5 Drawing Sheets

(56) References Cited

U.S. PATENT DOCUMENTS

| | | | |
|---|---|---|---|
| 2009/0187539 A1* | 7/2009 | Adams | G06F 8/20 707/713 |
| 2009/0234918 A1* | 9/2009 | Neumann | H04W 4/02 709/204 |
| 2012/0166465 A1* | 6/2012 | Teichmann | G06F 17/30471 707/765 |
| 2012/0265726 A1* | 10/2012 | Padmanabhan | G06F 17/303 707/602 |

* cited by examiner

SYNCHRONIZATION SYSTEM FOR TRANSFORMING DATABASE AND METHOD THEREOF

CROSS-REFERENCE TO RELATED APPLICATION

This application claims priority from Taiwan Patent Application No. 103143739, filed on Dec. 15, 2014, in the Taiwan Intellectual Property Office, the content of which are hereby incorporated by reference in their entirety for all purposes.

BACKGROUND OF THE INVENTION

1. Field of the Invention

This application relates to a synchronization system and a method thereof, and more particularly, to a synchronization system and method thereof for providing query while transforming database.

2. Description of the Related Art

Synchronizing the database is used to prevent the same data from causing the differences in different tables or different databases. When it comes to the synchronization of different databases, the conventional method mostly applies the timing synchronization mechanism. Namely, the data transformation of the source database and the target database is performed at a specific time point so as to achieve the objective of the synchronization. However, while performing the database transformation, accessing the database is limited for users, such as the failure in the database query or the lower effectiveness of the query. Hence, it is of paramount importance to avoid such technical problems happening in a real-time system or in a high-performance database management system.

Accordingly, the inventor of the present invention provides a novel synchronization system for transforming database and a method thereof to resolve the preceding technical problems.

SUMMARY OF THE INVENTION

In view of the aforementioned technical problem, the present invention provides a flexible synchronization method for transforming database and a method thereof, enabling users to choose different synchronization methods according to the practical requirements.

In view of the aforementioned technical problem, the present invention provides a synchronization method for transforming database and a method thereof aimed to resolve the technical problems concerning that the direct access mode cannot be performed while transforming database.

According to the preceding objective, the present invention provides a synchronization method for a database transformation, which may be applied to a data adapter and a database transformer. The data adapter may include a synchronization control unit, a storage unit and a statement parsing unit. The database transformer may transform tables from a source database into a target database, and the synchronization method may include the following steps. The synchronization control unit may be used to determine a query mechanism. The statement parsing unit may be used to receive a database query statement and to parse a query table related to the database query statement, and a transformation status of the query table may be returned to the synchronization control unit by the database transformer. Wherein, the transformation status may include a blocking stage, a transforming stage or a completing stage. The synchronization control unit may be used to perform the database query statement in the source database, the target database or both of them in accordance with the query mechanism and the transformation status.

Preferably, the synchronization method in accordance with the present invention may further include the following steps. The query mechanism may be set up as a blocking transformation mode. The database query statement may be performed in the source database if the transformation status is the blocking stage. The storage unit may be used to store the database query statement and then to form a to-be-synchronized database query statement if the transformation status is the transforming stage and the to-be-synchronized database query statement may be performed in the source database when the transforming stage ends. The to-be-synchronized database query statement may be performed in the target database if the transformation status is the completing stage and the to-be-synchronized database query statement exists in the storage unit. The database query statement may be performed in the target database and the source database if the transformation status is the completing stage and the to-be-synchronized database query statement does not exist in the storage unit.

Preferably, the synchronization method in accordance with the present invention may further include setting up the query mechanism as a blocking dump mode. The transforming stage may be formed of a dumping stage and a transforming stage. In the dumping stage, the query table may be separated into a plurality of partitioned files to dump the plurality of partitioned files to a distributed file system. In the transforming stage, the plurality of partitioned files may be combined to a combined file to transform the combined file into the target database.

Preferably, the synchronization method in accordance with the present invention may further include the following steps. The query mechanism may be set up as the blocking dump mode. The database query statement may be performed in the source database if the transformation status is the blocking stage. The storage unit may be used to temporarily store the database query statement and then to form the to-be-synchronized database query statement until the dumping stage ends if the transformation status is the dumping stage, and then to perform the to-be-synchronized database query statement in the source database. The storage unit may be used to temporarily store the database query statement, to form the to-be-synchronized database query statement and to perform the to-be-synchronized database query statement in the source database if the transformation status is the transforming stage. The to-be-synchronized database query statement may be performed in the target database if the transformation status is the completing stage and the to-be-synchronized database query statement exists in the storage unit. The database query statement may be performed in the source database and the target database if the transformation status is the completing stage and the to-be-synchronized database query statement does not exist in the storage unit.

Preferably, the synchronization method in accordance with the present invention may further include the following steps. The query mechanism may be set up as a direct access mode, the database query statement may be performed in the source database if the transformation status is the blocking stage. The storage unit may be used to temporarily store the database query statement, to form the to-be-synchronized database query statement and to perform the database query statement in the source database if the transformation status is the transforming stage. The to-be-synchronized database query statement may be performed in the target database if the transformation status is the completing stage and the to-be-synchronized database query statement exists in the storage unit. The database query statement may be performed in the source database and the target database if the transformation status is the completing stage and the database query statement does not exist in the storage unit.

According to the preceding objective, the present invention further provides a synchronization system for a database transformation which may include a database transformer configured to transform tables from a source database to a target database and a data adapter including a statement parsing unit, a storage unit, and a synchronization control unit. The statement parsing unit is configured to receive a database query statement and to parse a query table related to the database query statement. The storage unit is configured to temporarily store the database query statement. The synchronization control unit is configured to determine a query mechanism and to receive a transformation status of the query table returned by the database transformer, so as to perform the database query statement on the source database, the target database or both of them in accordance with the query mechanism and the transformation status.

Preferably, the transformation status may be a blocking stage, a transforming stage or a completing stage, and the query mechanism may be a blocking transformation mode, a blocking dump mode or a direct access mode.

Preferably, in the case that the query mechanism is the blocking transformation mode, when the transformation status is the blocking stage, the synchronization control unit may perform the database query statement in the source database. When the transformation status is the transforming stage, the synchronization control unit may use the storage unit to store the database query statement to form the to-be-synchronized database query statement, and the to-be-synchronized database query statement may be performed in the source database when the transforming stage ends. When the transformation status is the completing stage and the to-be-synchronized database query statement exists in the storage unit, the synchronization control unit may perform the to-be-synchronized database query statement in the target database. When the transformation status is the completing stage and the to-be-synchronized database query statement does not exist in the storage unit, the synchronization control unit may perform the database query statement in the source database and the target database.

Preferably, in the case that the query mechanism is the blocking dump mode, the transforming stage may be formed of a dumping stage and a transforming stage. In the dumping stage, the query table may be separated into a plurality of partitioned files, and the plurality of partitioned files may be dumped to a distributed file system. In the transforming stage, the plurality of partitioned files may be combined to a combined file to transform the combined file into the target database. When the transformation status is the blocking stage, the database query statement may be performed in the source database. When the transformation status is the dumping stage, the storage unit may temporarily store the database query statement to form a to-be-synchronized database query statement, and the to-be-synchronized database query statement may be performed in the source database when the dumping stage ends. When the transformation status is the transforming stage and the to-be-synchronized database query statement exists in the storage unit, the synchronization control unit may perform the to-be-synchronized database query statement in the source database. When the transformation status is the completing stage and the to-be-synchronized database query statement exists in the storage unit, the synchronization control unit may perform the to-be-synchronized database query statement in the target database. When the transformation status is the completing stage and the to-be-synchronized database query statement does not exist in the storage unit, the synchronization control unit may perform the database query statement in the source database and the target database.

Preferably, in the case that the query mechanism is the direct access mode, when the transformation status is the blocking stage, the synchronization control unit may perform the database query statement in the source database. When the transformation status is the transforming stage, the storage unit may store the database query statement to form the to-be-synchronized database query statement, and the synchronization control unit may perform the database query statement in the source database. When the transformation status is the completing stage and the to-be-synchronized database query statement exists in the storage unit, the synchronization control unit may perform the to-be-synchronized database query statement in the target database. When the transformation status is the completing stage and the to-be-synchronized database query statement does not exist in the storage unit, the synchronization control unit may perform the database query statement in the target database and the source database.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

The exemplary embodiments of the present invention will be understood more fully from the detailed description given below and from the accompanying drawings of various embodiments of the invention, which, however, should not be taken to limit the invention to the specific embodiments, but are for explanation and understanding only.

Figure 1:
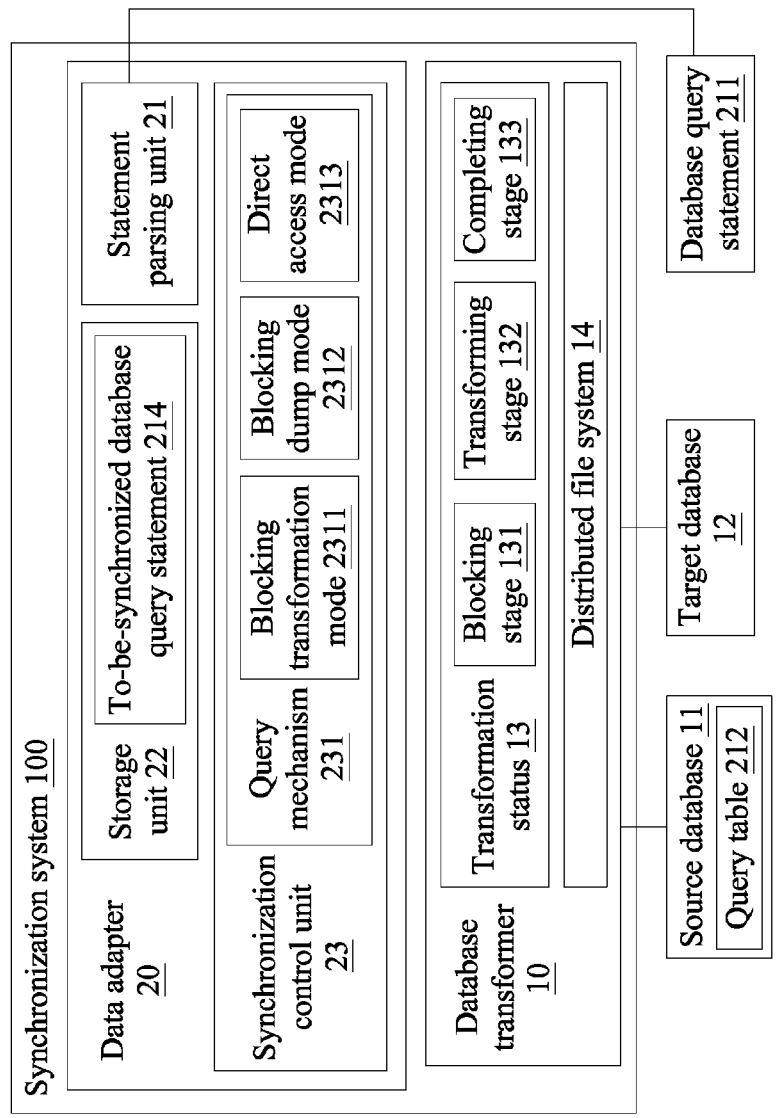
FIG. 1 is a block diagram of a synchronization system of the first embodiment in accordance with the present invention.

Please refer to FIG. 1 which is a block diagram of a synchronization system of the first embodiment in accordance with the present invention. As shown in FIG. 1, a synchronization system for transforming database 100 includes a database transformer 10 and a data adapter 20. In this embodiment, the database transformer 10 is a software application for performing transformation between the heterogeneous databases, but it shall not be limited thereto. The database transformer 10 may also be used to perform the transformation between the homogeneous databases. In this article, the transformation of a source database 11 and a target database 12 is used to represent the transformation between the heterogeneous databases. Here, as understood in the art to which the present invention pertains, database has a structure for associating tables having various fields as well as for allowing querying of the tables.

The data adapter 20 includes a statement parsing unit 21, storage unit 22, and a synchronization control unit 23. The data adapter 20 is used to receive a database query statement 211 and to parse a query table 212 related to the database query statement 211. The database query statement 211 mentioned here may be provided by another application, such as an interface which is feasible to the user to perform the database query statement 211, and is usually provided by a database management system. The database query statement 211 can be a form of a SQL statement, such as INSERT INTO Store_Information (Store_Name, Sales, Txn_Date) VALUES ('Los Angeles', 900, 'Jan-10-1999') which indicates that the three values of 'Los Angeles', 900, 'Jan-10-1999' are respectively inserted in the three fields of Store_Name, Sales, Txn_Date in the table of Store_Information.

It is worth mentioning that the database query statement 211 mentioned herein is mainly meant the statement for changing the tables in the database, such as the statements of insert, delete or update.

The storage unit 22 may be used to store the database query statement 211. The synchronous control unit 23 may be configured to determine a query mechanism 231 and to receive the transformation status 13 of the query table 212 returned by the database transformer 10, so as to perform the database query statement 211 in the source database 11, the target database 12 or both of them in accordance with the query mechanism 231 and the transformation status 13. Therefore, concerning the aforementioned SQL statement, the synchronous control unit 23 may receive the transformation status 13 related to the Store Information table from the database transformer 10. After each table is transformed, the transformation status 13 may be automatically returned to the synchronous control unit 23 by the database transformer 10, or the synchronous control unit 23 may trigger the returning.

It is worth mentioning that the synchronization system for transforming database 100 performs the synchronization based on a table as a unit, rather than a record as a unit. By means of this method, the cost of the output/input of hardware can be reduced when performing the synchronization.

To be precise, the transformation status 13 includes a blocking stage 131, a transforming stage 132 or a completing stage 133. The blocking stage 131 means that the query table 212 is only in the source database 11, and is to be transformed to the target database 12. The transforming stage 132 means that the query table 212 is transforming from the source database 11 to the target database 12. The completing stage 133 means that the query table 212 has been transformed from the source database 11 to the target database 12. In other words, the query table 212 does not exist in the target database 12 when the query table 212 is in the blocking stage 131. When the query table 212 is in the transforming stage 132, the query table 212 is partially in the target database 12. The query table 212 is shown completely in the target database 12 when the query table 212 is in the completing stage 133.

Furthermore, the query mechanism 231 may be a blocking transformation mode 2311, a blocking dump mode 2312, or a direct access mode 2313. The details will be explained as follows.

In the case that the query 231 is the blocking transformation mode 2311, when the transformation status is the blocking stage 131, the synchronization control unit 23 performs the database query statement 211 in the source database 11. When the transformation status is the transforming stage 132, the synchronization control unit 23 uses the storage unit to store the database query statement 211 to form the to-be-synchronized database query statement 214, and the to-be-synchronized database query statement 214 is performed in the source database 11 when the transforming stage 132 ends. In other words, when the transformation status is the transforming stage 132, the busy-waiting situation is formed. When the transformation status is the completing stage 133 and the to-be-synchronized database query statement 214 exists in the storage unit 22, the synchronization control unit 23 performs the to-be-synchronized database query statement 214 in the target database 12. When the transformation status is the completing stage 133 and the to-be-synchronized database query statement 214 does not exist in the storage unit 22, the synchronization control unit 23 performs the database query statement 211 in the target database 12 and the source database 11.

From the foregoing, when the transformation status is the transforming stage 132, the to-be-performed database query statement 211 has to be temporarily stored in the storage unit 22 to form the to-be-synchronized database query statement 214 because the to-be-performed database query statement 211 cannot be performed immediately. Before the next database query statement 211 is performed by the synchronization control unit 23, it has to perform the to-be-synchronized database query statement 214 stored in the storage unit 22. As a result, the dependence and the accuracy of the synchronized database can be confirmed. The two modes below also follow the rules to perform the database transformation.

For the blocking dump mode 2312, the transforming stage 132 is formed of a dumping stage 1321 and a transforming stage 1322. In the dumping stage 1321, the query table 212 is separated into a plurality of partitioned files, and the plurality of partitioned files are dumped to a distributed file system 14. In the transforming stage 1322, the plurality of partitioned files are combined to a combined file to transform the combined file into the target database 12. For the blocking dump mode 2321, when the transformation status is the blocking stage 131, the database query statement 211 is performed in the source database 22. When the transformation status is the dumping stage 1321, the storage unit 22 temporarily stores the database query statement 211 to form the to-be-synchronized database query statement 214, and the to-be-synchronized database query statement 214 is performed in the source database 11 when the dumping stage 1321 ends. When the transformation status is the transforming stage 133 and the to-be-synchronized database query statement 214 exists in the storage unit 22, the synchronization control unit 23 performs the to-be-synchronized database query statement 214 in the source database 12. When the transformation status is the completing stage 133 and the to-be-synchronized database query statement 214 exists in the storage unit, the synchronization control unit 23 performs the to-be-synchronized database query statement 214 in the target database 12. When the transformation status is the completing stage 133 and the to-be-synchronized database query statement 214 does not exist in the storage unit 22, the synchronization control unit 23 performs the database query statement 211 in the source database 11 and the target database 12.

For the direct access mode 2313, when the transformation status is the blocking stage 131, the synchronization control unit 23 performs the database query statement 211 in the source database 11. When the transformation status is the transforming stage 132, the storage unit 22 stores the database query statement 211 to form the to-be-synchronized database query statement 214, and the synchronization control unit 23 performs the database query statement 211 in the source database 11. When the transformation status is the completing stage 133 and the to-be-synchronized database query statement 214 exists in the storage unit 22, the synchronization control unit 23 performs the to-be-synchronized database query statement 214 in the target database 12. As to another situation, when the transformation status is the completing stage 133 and the to-be-synchronized database query statement 214 does not exist in the storage unit 22, the synchronization control unit 23 performs the database query statement 211 in the target database 12 and the source database 11.

Preferably, the data adaptor 20 may include a translator which is mainly to perform the to-be-synchronized database query statement 214 in the storage unit 22. In particular, when the data adaptor 20 is performing the transformation between the heterogeneous databases, such as from SQL database into non-SQL database, the translator may translate the SQL statement into the non-SQL statement, such that the query aimed to the non-SQL database can be performed successfully.

Figure 2:
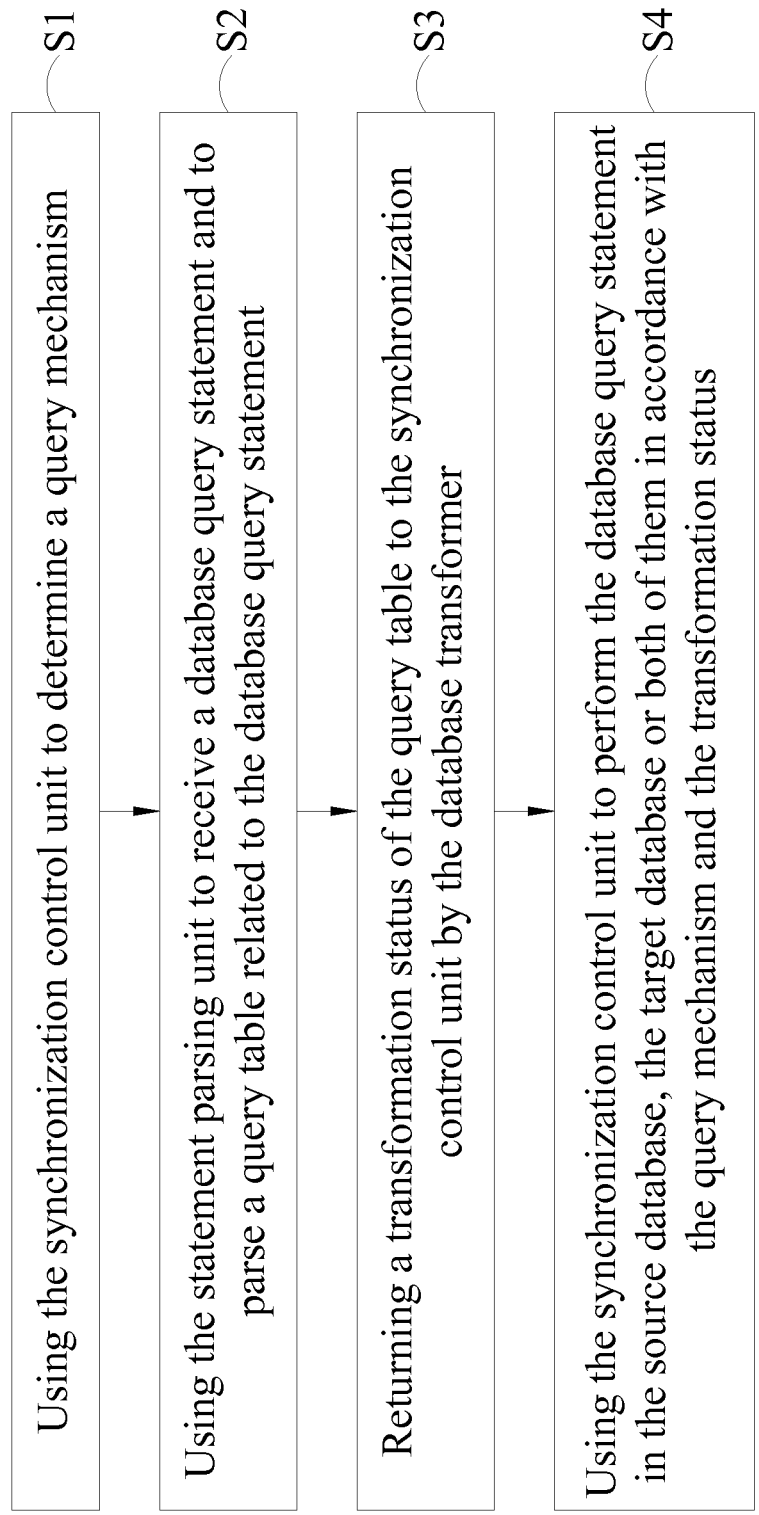
FIG. 2 is a flow chart of a synchronization method of the second embodiment in accordance with the present invention.

Please refer to FIG. 2 which is a flow chart of a synchronization method of the second embodiment in accordance with the present invention. The synchronization method used herein applies the same synchronization system as mentioned above. The synchronization method for a database transformation is applied to the data adapter 20 and the database transformer 10. The data adapter 20 includes the synchronization control unit 23, the storage unit 22 and the statement parsing unit 21. The database transformer transforms tables from the source database 11 into the target database 12. The synchronization method includes the following steps.

Step S1: the synchronization control unit 23 is used to determine the query mechanism 231, wherein the query mechanism 231 may be the blocking transformation mode 2311, the blocking dump mode 2312 or the direct access mode 2313.

Step S2: the statement parsing unit 21 is used to receive the database query statement 211 and to parse the query table 212 related to the database query statement 211. The database query statement 211 is mainly meant the statement for changing the tables in the database, such as the statements of insert, delete or update.

Step S3: the transformation status 13 of the query table 212 is returned to the synchronization control unit 23 by the database transformer 10, wherein the transformation status 13 includes the blocking stage 131, the transforming stage 132 and the completing stage 133.

Step S4: the synchronization control unit 23 is used to perform the database query statement 211 in the source database 11, the target database 12 or both of them in accordance with the query mechanism 231 and the transformation status 13.

Figure 3:
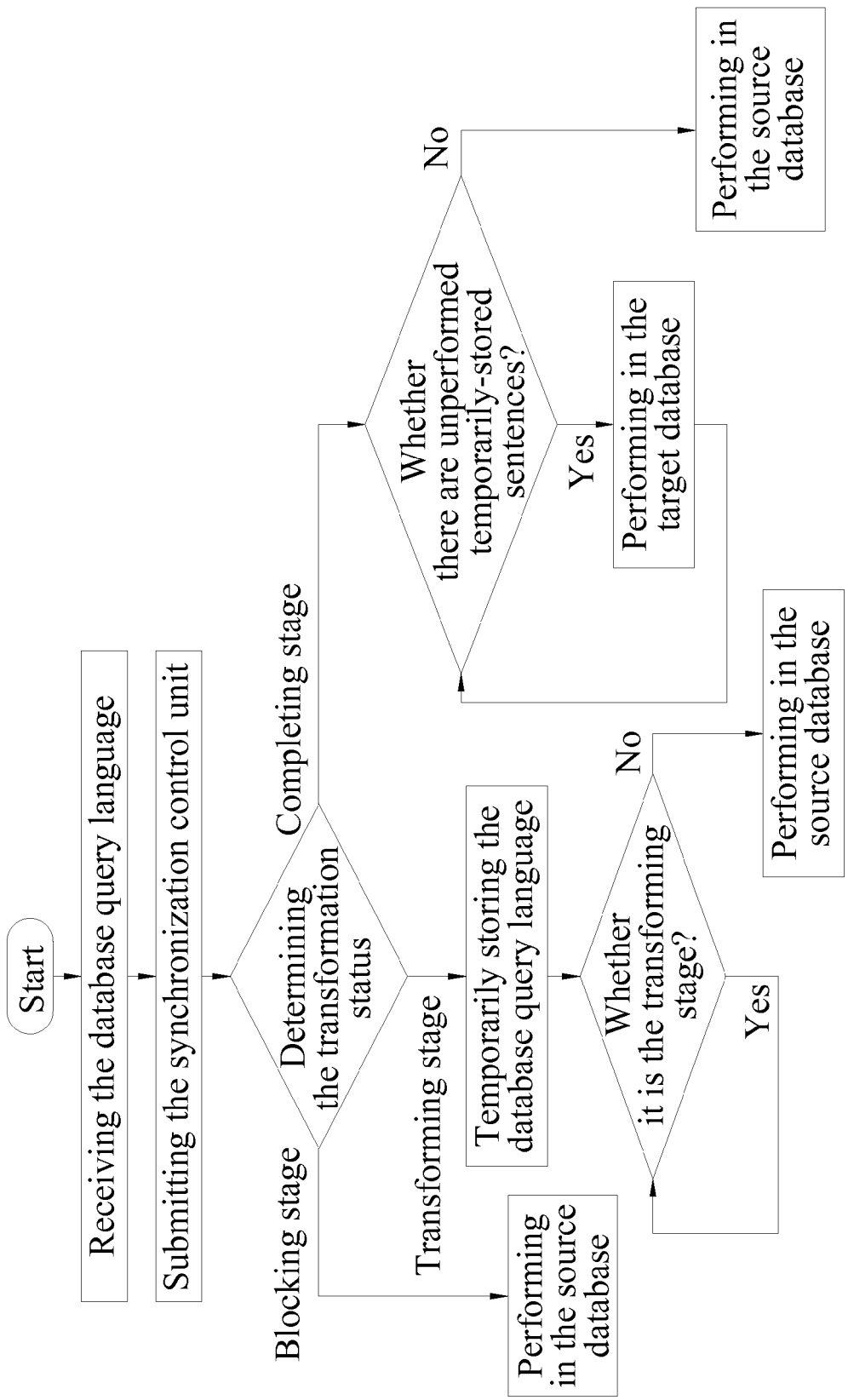
FIG. 3 is a flow chart of a blocking transformation mode of the second embodiment in accordance with the present invention.

Please refer to FIG. 2 and FIG. 3 together, wherein FIG. 3 is a flow chart of a blocking transformation mode of the second embodiment in accordance with the present invention. For the blocking transformation mode 2311, initially, the statement parsing unit 21 receives the database query statement 211 and the statement parsing unit 21 parses the query table 212 related to the database query statement 211, and the database query statement 211 is submitted to the synchronization control unit 23 for performing the database query. But the synchronization control unit 23 has to obtain the transformation status 13 of the query table 212 in the database transformer 10 in advance.

Provided that the transformation status 13 is the blocking stage 131, the current query table 212 only exists in the source database 11. The database query statement 211 can be performed instantly in the source database 11. The source database 11 and the target database 12 can be synchronized when the query table 212 is transformed to the target database 12.

If the transformation status 13 is the transforming stage 132, the database query statement 211 is stored by the storage unit 22 to form the to-be-synchronized database query statement 214, and the to-be-synchronized database query statement 214 is only performed in the source database 11 when the transforming stage 132 ends (the to-be-synchronized database query statement 214 is equivalent to the database query statement 211 at this moment). What has to be noted here is that the query table 212 in the source database 11 and the target database 12 are not synchronized at this moment.

Moreover, if the transformation status 13 is the completing stage 133 and the to-be-synchronized database query statement 214 is stored in the storage unit 22, the to-be-synchronized database query statement 214 is performed in the target database 12, such that the query table 212 in the target database 12 is synchronized with the source database 11. On the other hand, if there is no the to-be-synchronized database query statement 214 stored in the storage unit 22 found, the database query statement 211 is directly performed in the source database 11 and the target database 12.

In short, only when the query table 212 is being in the transforming stage 132, the user's query to the source database is limited. For the target database 12, as the database query statement 211 is usually of the dependency, it has to complete the to-be-synchronized database query statement 214 which is temporarily stored before the database query statement 211 is in the completing stage 133. The database query statement 211 can thus be performed in the query table 212.

Figure 4:
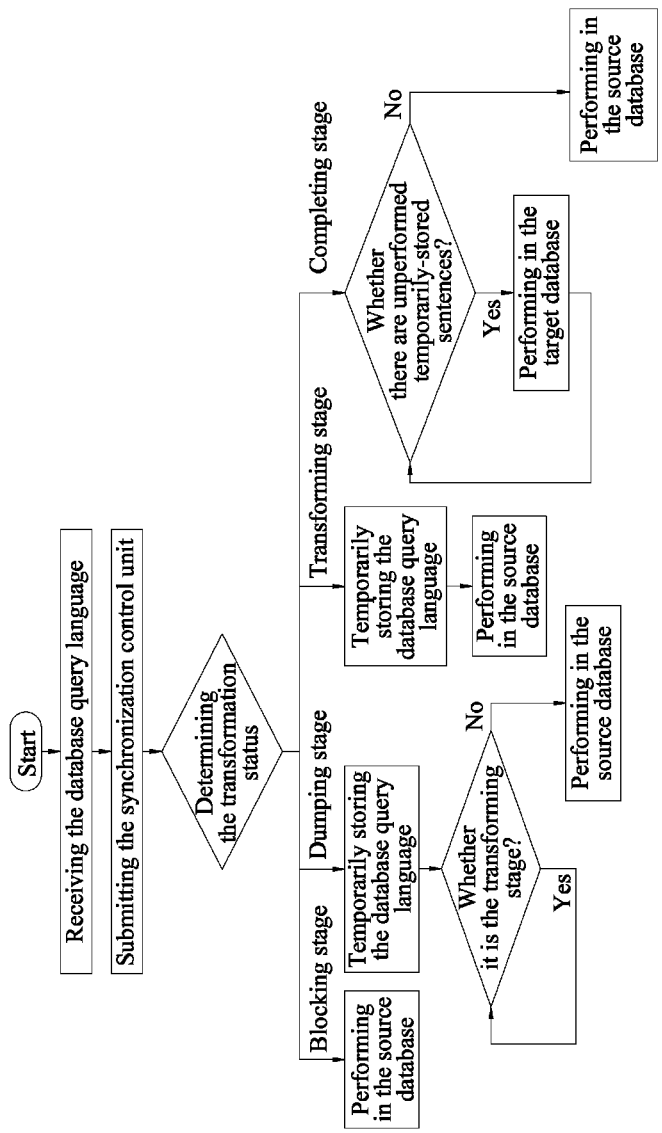
FIG. 4 is a flow chart of a blocking dump mode of the second embodiment in accordance with the present invention.

Please refer to FIG. 2 and FIG. 4 together, wherein the FIG. 4 is a flow chart of a blocking dump mode of the second embodiment in accordance with the present invention. The mode mentioned herein is substantially the same as the steps of the blocking transformation mode 2311, and the difference only lies in the transforming stage 132 in the blocking dump mode 2312. The transforming stage 132 is subdivided into the dumping stage 1321 and the transforming stage 1322. As the other steps are akin to that of the blocking transformation mode 2311, the unnecessary details are no longer given herein. Only the dumping stage 1321 and the transforming stage 1322 are explained.

In the dumping stage 1321, the query table 212 is separated into a plurality of partitioned files to dump the plurality of partitioned files to a distributed file system 14, and in the transforming stage 1322, the plurality of partitioned files are combined to a combined file to transform the combined file into the target database 12.

In detail, the storage unit 22 is used to temporarily store the database query statement 214 and then forms the to-be-synchronized database query statement 214 until the dumping stage 1321 ends if the transformation status 13 is the dumping stage 1321, and then performs the to-be-synchronized database query statement 214 in the source database 11.

Moreover, the storage unit 22 is used to temporarily store the database query statement 211 to form the to-be-synchronized database query statement 214, and to perform the to-be-synchronized database query statement 214 in the source database 11 if the transformation status 13 is the transforming stage 1322 (in this case the to-be-synchronized database query statement 214 is equivalent to the database query statement 211).

It is worth mentioning that the database query sentence 211 is unallowable to query the query table 212 in the source database 11 and the target database 212 in the dumping stage 1321. Hence, the query table 212 in the source database 11 and the target database 212 shall be consistent, that is, the relation of the synchronization.

In short, only when the query table 212 is being in the dumping stage 1321, the user's query to the source database 11 is limited. For the target database 12, as the dependency may exist in the database query statement 211 and the to-be-synchronized database query statement 214, it has to complete the to-be-synchronized database query statement 214 which is temporarily stored before the database query statement 211 is in the completing stage 133. The database query statement 211 can thus be performed in the query table 212.

Figure 5:
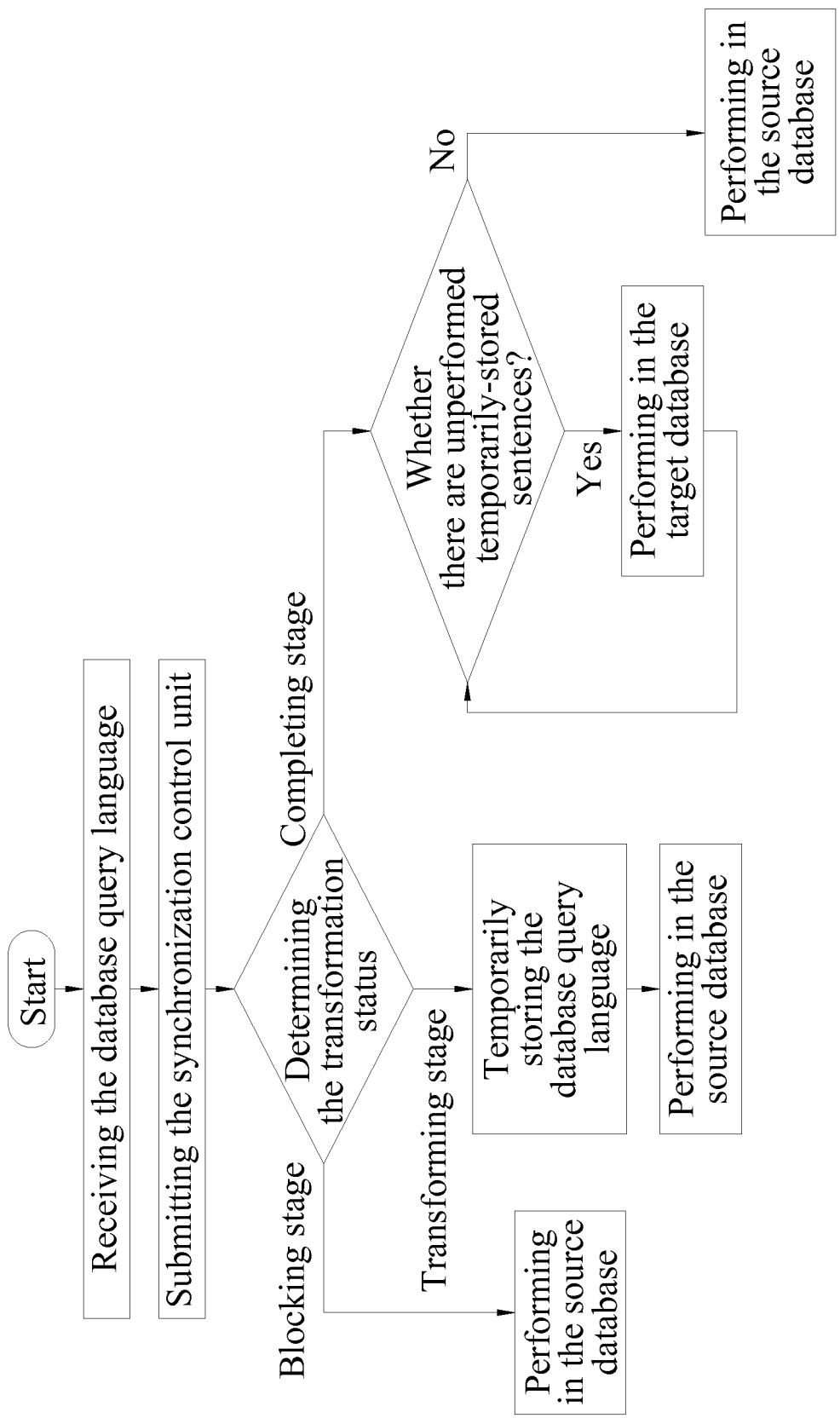
FIG. 5 is a flow chart of a direct access mode of the second embodiment in accordance with the present invention.

Please refer to FIG. 2 and FIG. 5 together, wherein FIG. 5 is a flow chart of a direct access mode of the second embodiment in accordance with the present invention. The mode mentioned herein is substantially the same as the steps of the blocking transformation mode 2311, and the difference only lies in the transforming stage 132. As the other steps are akin to that of the blocking transformation mode 2311, the unnecessary details are no longer given herein. Only the transforming stage 132 is explained.

The storage unit 22 is used to temporarily store the database query statement 211 to form the to-be-synchronized database query statement 214, and to directly perform the to-be-synchronized database query statement 214 in the source database 11 if the transformation status 13 is the transforming stage 132 (in this case the to-be-synchronized database query statement 214 is equivalent to the database query statement 211). The source database 11 is not synchronized with the target database 12 at this moment, and the synchronization method thereof has been described in the completing stage 133 in the blocking transformation mode 2311. The unnecessary details are no longer given herein.

In short, in the mode, the user's queries to the source database 11 are all not limited. For the target database 12, as the database query statement 211 and the to-be-synchronized database query statement 214 may exist dependency, it has to complete the to-be-synchronized database query statement 214 which is temporarily stored before the database query statement 211 is in the completing stage 133. The database query statement 211 can thus be performed in the query table 212.

From the above, the present invention provides a synchronization system for transforming database and a method thereof which enables user to choose the optimal query mechanism 231 according to the personal requirements when transforming the database, such that the limitation may be minimized when the user accesses the database.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A synchronization method for a database transformation, which is applied to a data adapter and a database transformer, the data adapter comprising a synchronization control unit, a storage unit and a statement parsing unit, the database transformer transforming tables from a source database into a target database, and the synchronization method comprising:

using the synchronization control unit to determine a query mechanism;

using the statement parsing unit to receive a database query statement and to parse a query table related to the database query statement;

returning a transformation status of the query table to the synchronization control unit by the database transformer, wherein the transformation status comprises a blocking stage, a transforming stage or a completing stage; and using the synchronization control unit to perform the database query statement in the source database, the target database or both of them in accordance with the query mechanism and the transformation status;

wherein the synchronization method further comprises:

setting up the query mechanism as a blocking transformation mode;

performing the database query statement in the source database if the transformation status is the blocking stage;

using the storage unit to store the database query statement and then forming a to-be-synchronized database query statement if the transformation status is the transforming stage, and performing the to-be-synchronized database query statement in the source database when the transforming stage ends;

performing the to-be-synchronized database query statement in the target database if the transformation status is the completing stage and the to-be-synchronized database query statement exists in the storage unit;

performing the database query statement in the target database and the source database if the transformation status is the completing stage and the to-be-synchronized database query statement does not exist in the storage unit.

2. The synchronization method according to claim 1, further comprising:

setting up the query mechanism as a blocking dump mode, wherein the transforming stage is formed of a dumping stage and a transforming stage; in the dumping stage, the query table is separated into a plurality of partitioned files to dump the plurality of partitioned files to a distributed file system; in the transforming stage, the plurality of partitioned files are combined to a combined file to transform the combined file into the target database.

3. The synchronization method according to claim 2, further comprising:
  setting up the query mechanism as the blocking dump mode,
  performing the database query statement in the source database if the transformation status is the blocking stage;
  using the storage unit to temporarily store the database query statement and then forming a to-be-synchronized database query statement until the dumping stage ends if the transformation status is the dumping stage, and then performing the to-be-synchronized database query statement in the source database;
  using the storage unit to temporarily store the database query statement, to form the to-be-synchronized database query statement and to perform the to-be-synchronized database query statement in the source database if the transformation status is the transforming stage;
  performing the to-be-synchronized database query statement in the target database if the transformation status is the completing stage and the to-be-synchronized database query statement exists in the storage unit;
  performing the database query statement in the source database and the target database if the transformation status is the completing stage and the to-be-synchronized database query statement does not exist in the storage unit.

4. The synchronization method according to claim 1, further comprising:
  setting up the query mechanism as a direct access mode;
  performing the database query statement in the source database if the transformation status is the blocking stage;
  using the storage unit to temporarily store the database query statement, to form the to-be-synchronized database query statement and to perform the database query statement in the source database if the transformation status is the transforming stage;
  performing the to-be-synchronized database query statement in the target database if the transformation status is the completing stage and the to-be-synchronized database query statement exists in the storage unit;
  performing the database query statement in the source database and the target database if the transformation status is the completing stage and the to-be-synchronized database query statement does not exist in the storage unit.

5. A synchronization system for a database transformation, comprising:
  a database transformer configured to transform tables from a source database to a target database; and
  a data adapter comprising:
    a statement parsing unit configured to receive a database query statement and to parse a query table related to the database query statement;
    a storage unit configured to temporarily store the database query statement; and
    a synchronization control unit configured to determine a query mechanism and to receive a transformation status of the query table returned by the database transformer, so as to perform the database query statement in the source database, the target database or both of them in accordance with the query mechanism and the transformation status;
  wherein the transformation status comprises is a blocking stage, a transforming stage or a completing stage; the query mechanism is a blocking transformation mode, a blocking dump mode or a direct access mode
  wherein in the case that the query mechanism is the blocking transformation mode, when the transformation status is the blocking stage, the synchronization control unit performs the database query statement in the source database; when the transformation status is the transforming stage, the synchronization control unit uses the storage unit to store the database query statement to form a to-be-synchronized database query statement, and the to-be-synchronized database query statement is performed in the source database when the transforming stage ends; when the transformation status is the completing stage and the to-be-synchronized database query statement exists in the storage unit, the synchronization control unit performs the to-be-synchronized database query statement in the target database; when the transformation status is the completing stage and the to-be-synchronized database query statement does not exist in the storage unit, the synchronization control unit performs the database query statement in the source database and the target database.

6. The synchronization system according to claim 5, wherein in the case that the query mechanism is the blocking dump mode, the transforming stage is formed of a dumping stage and a transforming stage, wherein in the dumping stage, the query table is separated into a plurality of partitioned files, and the plurality of partitioned files are dumped to a distributed file system; in the transforming stage, the plurality of partitioned files are combined to a combined file, to transform the combined file into the target database; when the transformation status is the blocking stage, the database query statement is performed in the source database; when the transformation status is the dumping stage, the storage unit temporarily stores the database query statement to form a to-be-synchronized database query statement, and the to-be-synchronized database query statement is performed in the source database when the dumping stage ends; when the transformation status is the transforming stage and the to-be-synchronized database query statement exists in the storage unit, the synchronization control unit performs the to-be-synchronized database query statement in the source database; when the transformation status is the completing stage and the to-be-synchronized database query statement exists in the storage unit, the synchronization control unit performs the to-be-synchronized database query statement in the target database; when the transformation status is the completing stage and the to-be-synchronized database query statement does not exist in the storage unit, the synchronization control unit performs the database query statement in the source database and the target database.

7. The synchronization system according to claim 5, wherein in the case that the query mechanism is the direct access mode, when the transformation status is the blocking stage, the synchronization control unit performs the database query statement in the source database; when the transformation status is the transforming stage, the storage unit stores the database query statement to form the to-be-synchronized database query statement, and the synchronization control unit performs the database query statement in the source database; when the transformation status is the completing stage and the to-be-synchronized database query statement exists in the storage unit, the synchronization control unit performs the to-be-synchronized database query statement in the target database; when the transformation status is the completing stage and the to-be-synchronized database query statement does not exist in the storage unit, the synchronization control unit performs the database query statement in the target database and the source database.

\* \* \* \* \*